(12) United States Patent
Turmeau et al.

(10) Patent No.: US 9,670,954 B2
(45) Date of Patent: Jun. 6, 2017

(54) BALL JOINT MEMBER WITH PERMANENT LUBRICATION

(71) Applicant: SKF Aerospace France, Saint-Vallier (FR)

(72) Inventors: Arnaud Turmeau, Mallisard (FR); Camille Dayot, Valence (FR)

(73) Assignee: SKF Aerospace France, Saint-Vallier (FR)

( * ) Notice: Subject to any disclaimer, the term of this patent is extended or adjusted under 35 U.S.C. 154(b) by 93 days.

(21) Appl. No.: 14/643,027

(22) Filed: Mar. 10, 2015

(65) Prior Publication Data
US 2015/0252839 A1    Sep. 10, 2015

(30) Foreign Application Priority Data

Mar. 10, 2014 (FR) .................................... 14 51961

(51) Int. Cl.
| | |
|---|---|
| *F16C 33/10* | (2006.01) |
| *F16C 11/06* | (2006.01) |
| *F16C 23/04* | (2006.01) |
| *F16C 33/04* | (2006.01) |
| *F16C 33/12* | (2006.01) |

(52) U.S. Cl.
CPC ........ *F16C 11/068* (2013.01); *F16C 11/0614* (2013.01); *F16C 23/045* (2013.01); *F16C 33/043* (2013.01); *F16C 33/103* (2013.01); *F16C 33/121* (2013.01); *F16C 33/124* (2013.01); *F16C 33/1065* (2013.01); *F16C 2240/44* (2013.01); *F16C 2326/43* (2013.01)

(58) Field of Classification Search
CPC ............................. F16C 11/068; F16C 23/045
See application file for complete search history.

(56) References Cited

U.S. PATENT DOCUMENTS

| | | | |
|---|---|---|---|
| 4,123,122 A | 10/1978 | Gabrielson et al. | |
| 4,765,757 A | 8/1988 | Hartl | |
| 4,848,934 A | 7/1989 | Blakely et al. | |
| 5,660,482 A | 8/1997 | Newley et al. | |
| (Continued) | | | |

FOREIGN PATENT DOCUMENTS

| | | |
|---|---|---|
| DE | 339649 C | 7/1921 |
| DE | 7619212 U1 | 10/1976 |
| (Continued) | | |

OTHER PUBLICATIONS

Institut National de la Propriété Industrielle (INPI), Rapport de Recherche Préliminaire, FR 14 51961, Nov. 28, 2014.

*Primary Examiner* — Thomas R. Hannon
(74) *Attorney, Agent, or Firm* — Soquel Group LLC

(57) ABSTRACT

A ball joint member including an inner ring, with a general axisymmetrical shape around a first axis, including an external contact surface having a truncated spherical shape, the inner ring including a coating which bears the external contact surface and an outer ring, of a general axisymmetrical shape around a second axis, including an internal contact surface mating the external contact surface, cooperating with the external contact surface, the outer ring including a coating which bears the internal contact surface, wherein at least one of the inner and outer rings includes lubricant reservoirs made on the coating of one of the external and internal contact surfaces, and wherein the coating of the contact surface of one of the rings is textured with microcavities forming the lubricant reservoirs.

15 Claims, 2 Drawing Sheets

(56) References Cited

U.S. PATENT DOCUMENTS

2004/0197038 A1 10/2004 Fujita et al.
2006/0062502 A1 3/2006 Hupp
2009/0154990 A1 6/2009 Julliere

FOREIGN PATENT DOCUMENTS

| DE | 102006004759 A1 | 8/2007 |
| DE | 102011106818 A1 | 3/2012 |
| FR | 519962 A | 6/1921 |
| GB | 2421057 A | 6/2006 |

BALL JOINT MEMBER WITH PERMANENT LUBRICATION

The present invention relates to a ball joint member with permanent lubrication.

A ball joint member is already known in the state of the art of the type including:
- an inner ring with a generally axisymmetrical shape around a first axis, comprising an external contact surface having a truncated spherical shape, and
- an outer ring, of a general axisymmetrical shape around a second axis, comprising an internal contact surface mating said external surface and cooperating with this external surface.

In the present description, the terms of "inner" and "outer" are considered according to radial positionings relatively to the first, respectively the second axis. In particular, when the first and second axes coincide, the inner ring is closer to the axis than the outer ring. Moreover, a surface is said to be internal when it is turned towards the axis, and external when it is turned opposite to the axis.

Such a joint member allows a movement of rotation of the outer ring around the second axis, with respect to the inner ring, or a movement of rotation of the inner ring around the first axis, with respect to the outer ring respectively.

The joint member also allows a relative movement a so-called <<swiveling>> movement, corresponding to a rotation of the outer ring with respect to the inner ring around any axis (a so-called <<swivel axis>>) perpendicular to the first axis or, respectively to a rotation of the inner ring with respect to the outer ring around any swivel axis perpendicular to the second axis.

In the aeronautical industry, such members notably equip landing gears and pylons for supporting reactors or propellers of certain aircraft. The pylons are intended to support the weight of the reactors and to transmit the thrust of the reactors, and the ball joint members should therefore compensate for the alignment defects of the reactors and for the deformations of the pylons.

In such a joint member, the inner and outer rings are generally made in metal. A metal-on-metal contact requires good lubrication in order to have good operation and a good lifetime. For this purpose, one of the rings generally has a contact surface provided with grooves, also called <<grease channels>>, allowing circulation of grease between the contact surfaces of the rings, from a lubricant tank located on the outside of the joint member.

In most cases, an operator has to provide a fresh amount of lubricant in the tank so that the joint member may continue to operate without being deteriorated at the areas where the stresses are the strongest, provided that such a provision of additional lubricant is possible considering the configuration in which the joint member is mounted.

Making grooves on the contact surfaces of the inner and outer rings of the joint member is known from WO-A-2012/148899, and filling the grooves with a porous material impregnated with lubricant. Such a technical solution does not give entire satisfaction since it is only adapted to liquid lubricants, such as oils, and not to greases and to solid lubricants. Now, oils cannot be used within the scope of ball joints when the relative speeds between the rings is too low to establish an elastohydrodynamic lubrication, especially when the rings oscillate at low speed one with respect to the other.

The object of the invention is notably to find a remedy to these drawbacks, by proposing a ball joint member having good lubrication and a satisfactory lifetime without requiring subsequent provision of lubricant.

For this purpose, the object of the invention is notably a ball joint member, of the type including an inner ring, with a general axisymmetrical shape around a first axis, comprising an external contact surface having a truncated spherical shape, the inner ring including a coating which bears the external contact surface, and an outer ring, of a general axisymmetrical shape around a second axis, comprising an internal contact surface mating said external contact surface, cooperating with said external contact surface, the outer ring including a coating which bears the internal contact surface.

According to the invention, at least one of the inner and outer rings comprises lubricant reservoirs made on the coating of one of the external and internal contact surfaces and the coating of the contact surface of one of the rings is textured with micro-cavities forming the lubricant reservoirs.

The micro-cavities therefore allow efficient and long-lasting lubrication of the ball joint member, and avoid the need for providing a fresh amount of lubricant. The joint members are thus lubricated for life.

A joint member according to the invention may further include one or more of the following features, taken alone or according to all the technically conceivable combinations:
- The textured surface includes at least one transverse groove extending between first and second ends shifted in the direction of the axis of the corresponding ring.
- Each transverse groove has a sinuous shape, for example a broken line shape.
- The textured surface includes a central circumferential groove circularly extending around the axis of the corresponding ring, at least one of the transverse grooves opening into the central circumferential groove.
- The pattern of micro-cavities extends over the whole of the textured surface.
- Each micro-cavity has a diameter comprised between 10 and 100 μm.
- The lubricant reservoirs are fluidically connected to each other or not.
- The lubricant reservoirs also comprise at least one groove extending over a portion of the surface contact of one of the rings.
- The lubricant reservoirs include at least one circumferential groove, circularly extending around the central axis of one of the rings.
- The depth of the grooves with respect to the contact surfaces is of the order of 1 mm.
- The width of the grooves is of the order of 1 mm.
- At least one of the rings is made of a titanium alloy.
- The coating of the inner ring is made from a copper alloy.
- The coating of the inner ring is made of CuNiIn, or CuAlFe with graphite.
- The coating of the outer ring is made from a material selected in a list of alloys including tungsten carbide, chromium nitride and titanium nitride.

The invention will be better understood upon reading the description which follows, only given as an example and made with reference to the appended figures, wherein.

Figure 1:
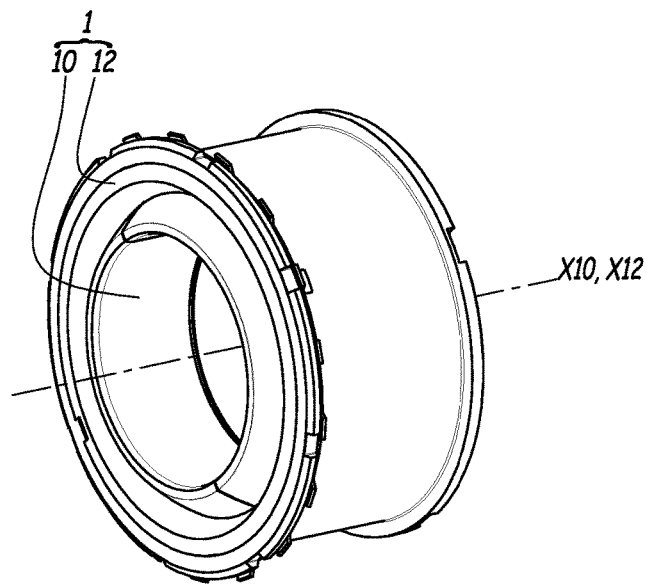
FIG. 1 is a perspective view of a joint member according to the invention.
Figure 2:
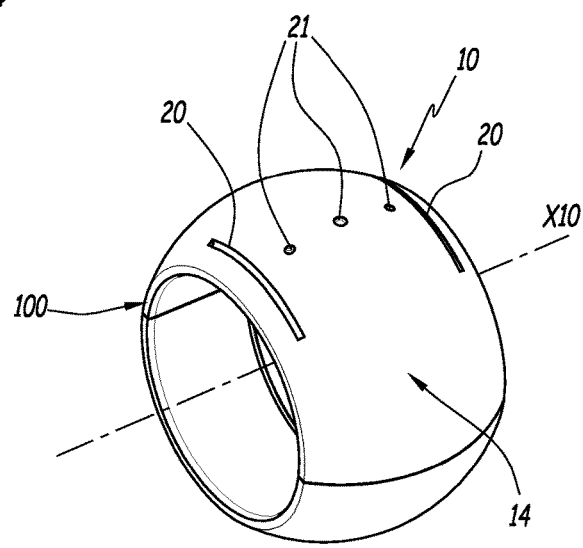
FIG. 2 is a perspective view of an inner ring of the joint member of FIG. 1.
Figure 3:
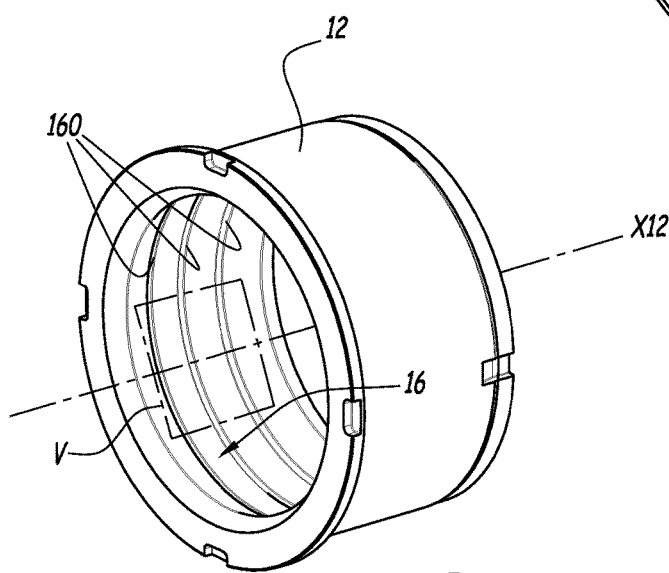
FIG. 3 is a perspective view of an outer ring of the joint member of FIG. 1.

A ball joint member 1 is illustrated in FIG. 1. This ball joint member comprises an inner ring 10 and an outer ring 12, respectively illustrated separately in FIGS. 2 and 3.

The inner ring 10 has a general axisymmetrical shape around a first axis X10, and comprises an external contact surface 14 having a truncated spherical shape at its ends in the direction of the axis X10 through axial end surfaces 100 perpendicular to the axis X10.

Such an inner ring 10 is generally hollow, delimiting an inner space, so that such an inner ring 10 is generally intended to be fitted onto a rod mating a first element to be bound.

The inner ring 10 is for example made in a titanium alloy, coated with a thick deposit or coating of a copper alloy, said thick deposit or coating bearing the external surface 14.

The coating of the inner ring 10 may be obtained by thermal spraying, such as Alacrite 602 or T400. The coating may be made of alloys such as CuNiIn, or CuAlFe with graphite.

The outer ring 12 has a general axisymmetrical shape around a second axis X12, and comprises an internal contact surface 16 mating the external contact surface 14, intended to cooperate with this external contact surface 14. In FIG. 1, the axes X10 and X12 coincide.

This outer ring 12 is generally intended to be secured to a second element to be bound. Thus, the first and second elements to be bound are bound by a ball joint via the joint member 1. The first element to be bound may be secured to a reactor of an aircraft, while the second element to be bound may be secured to a pylon for supporting the reactor. Such a joint member 1 can also be integrated in an articulation of a landing gear.

The outer ring 12 is for example made in a titanium alloy, coated with a hard thin deposit or coating, said thin deposit or coating bearing the internal contact surface 16.

The coating of the outer ring 12 may be made of alloys such as tungsten carbide such as Wcc-h, or chromium nitride or titanium nitride.

The coating of the outer ring 12 is much harder than the one of the inner ring 10, so that the coating of the inner ring 10 works as a sacrificial coating.

In order to be lubricated for life, the joint member 1 includes at least one lubricant reservoir made on the coating of one of the contact surfaces 14 and 16. The joint member preferably comprises at least two lubricant reservoirs, fluidically connected with each other or not. The lubricant reservoirs are formed by recessed portions made on the coatings of the contact surfaces 14 and 16.

Figure 6:
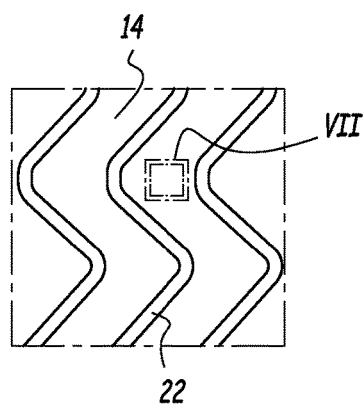
FIG. 6 is a larger scale view of the detail VI of the external contact surface of the inner ring of FIG. 4.
Figure 7:
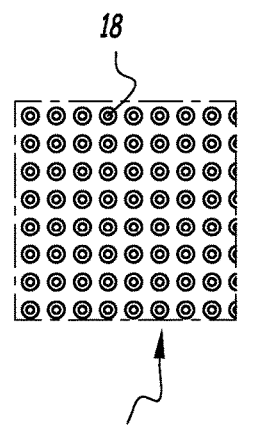
FIG. 7 is a larger scale view of the detail VII in FIG. 6.

As represented on FIGS. 6 and 7, one of the external 14 and internal 16 contact surfaces, a so called textured surface, has a pattern of micro-cavities 18 distributed over at least one portion of the coating of this textured surface. These micro-cavities 18 are intended to receive a lubricant, notably a grease, and thereby form reservoirs of lubricant.

In the illustrated example, the textured surface is the external contact surface 14. A detail of this textured surface 14 is illustrated in FIG. 6, and an enlargement of the textured surface 14 of FIG. 6 is illustrated in FIG. 7 showing said micro-cavities 18.

Advantageously, the pattern of micro-cavities 18 extends over the whole of the textured surface 14. Each micro-cavity for example has a diameter comprised between 10 and 100 micrometers (μm). The distance between two adjacent micro-cavities is relatively small, so that the pattern of micro-cavities 18 has a strong density adapted for efficient lubrication of the whole of the joint member 1.

The pattern of micro-cavities 18 is preferably made by laser texturation of the textured surface 14. Such a laser texturation method is well known per se, and will therefore not be further described.

As an alternate embodiment, the pattern of micro-cavities may also be made by turning or grinding.

Optionally, the textured surface 14 may also include at least one circumferential groove 20, extending around the axis X10, intended to accommodate lubricant, notably in order to promote circulation of lubricant circumferentially around the textured surface 14.

Moreover, in order to facilitate transverse circulation of lubricant between the internal 16 and external 14 contact surfaces, the textured surface 14 preferably includes at least one transverse groove 22, extending between the end surfaces 100 of the inner ring 10. For example, the textured surface 14 includes a plurality of cross grooves 22 positioned parallel with each other, as this is illustrated in FIG. 6.

Each transverse groove 22 for example has a sinuous shape, notably a broken line shape, so as to optimally extend over the textured surface 14.

Advantageously, each transverse groove 22 opens into the central circumferential groove 20, in order to be supplied with lubricant by the latter.

Because of the difficulty of mechanically machining a thick accommodating deposit, the circumferential groove 20 and the transverse groove 22 are advantageously made by laser machining.

By the pattern of micro-cavities 18, preferably extending over the whole of the textured surface 14, this textured surface 14 remains permanently lubricated.

Optionally, the lubricant reservoirs may also comprise circumferential grooves 20 made on the inner ring 10, which extend over a limited angular sector of the external surface 14. The grooves 20 extend to the vicinity of the end surfaces 100, in areas where the stresses to which the surfaces 14 and 16 are subject, are high during operation of the joint member 1. The grooves contain a sufficient amount of lubricant which is moved towards the other areas by the relative displacements of the inner 10 and outer 12 rings. Thus, the lubricant is directly present in critical areas of the joint member 1. The latter is therefore permanently lubricated without requiring any additional provisions of lubricant.

Figure 4:
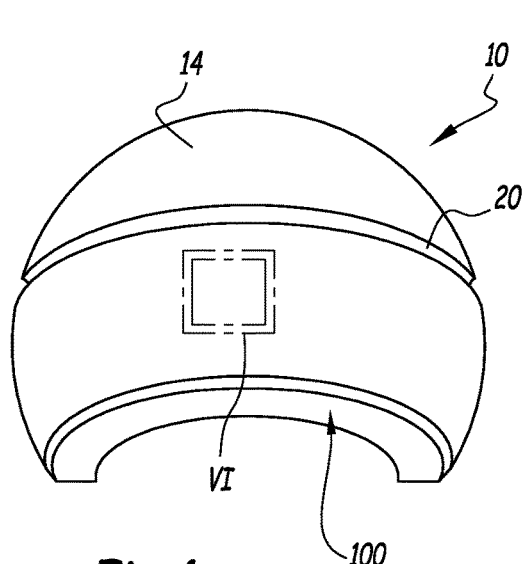
FIG. 4 is a partial perspective view and according to another angle, of an alternative of the inner ring of FIG. 2.

According to an alternative illustrated in FIG. 4, the surface 14 may include at least one circumferential groove 20 circularly extending around the axis X10 at an equal distance from the end surfaces 100, forming a lubricant reservoir in the central portion of the textured surface 14.

The lubricant reservoirs may also comprise holes 21 made on the surface 14 in a central peripheral area of the inner ring 10 with respect to the end surfaces 100. The holes 21 are provided between the grooves 20. A hole 21 is notably provided at an equal distance from the end surfaces 100, in an area where the stresses are strong in a configuration for operating the joint member 1.

The internal contact surface 16 of the outer ring 12 also comprises lubricant reservoirs formed by circumferential grooves 160 extending around the axis X12.

The depth of the grooves 20 and 160 and of the holes 21 with respect to the surfaces 14 and 16 is preferably of the order of 1 mm.

The width of the grooves 20 and 160 and of the holes 21 is also preferably in the order of 1 mm.

The grooves 20 and 160 and the holes 21 may be made by means of different machining methods such as cutting with a water jet, etching with nitric acid, milling, turning or knurling, inter alia.

The lubricant may be a grease, or a solid lubricant, such as a soft metal, a lamellar lubricant, graphite, a sintered metal, or a bonded coating.

Figure 5:
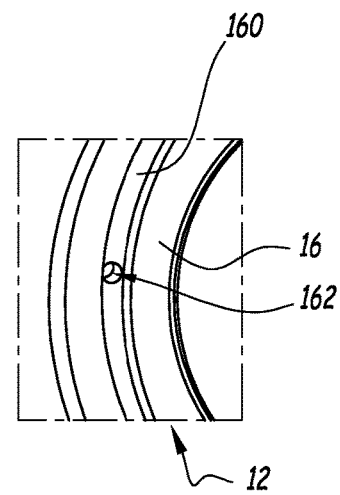
FIG. 5 is a larger scale view of the detail V in FIG. 3.

According to an optional aspect illustrated in FIG. 5, the grooves 160 may comprise holes 162 forming additional spaces for storing a lubricant.

According to another optional aspect not shown of the invention, the joint member 1 may comprise seal gaskets giving the possibility of preventing leakage of the lubricant to the outside of the joint member 1.

The invention allows the making of a joint member with permanent lubrication, and this without any risk of deteriorating either one of the inner or outer rings. The joint member therefore does not require any maintenance, and its lifetime is increased with respect to the joint members of the prior art in which an external lubricant reservoir has to be regularly supplied. Further, the loads and the temperatures which the joint member may support during operation are also increased.

It has been surprisingly observed that other advantages are also provided by the invention, notably the fact that particles present in the vicinity of inner and outer rings, in particular hard particles detached from the coating on the outer ring 12 or from the outer ring 12 itself, may be captured in the lubricant reservoirs, so as to reduce the wear of the joint member. When a solid lubricant is used, this also gives the possibility of controlling the mechanical plays in the joint member.

It will be noted that the invention is not limited to the embodiments described earlier, but may have various alternatives without departing from the scope of the claims. The features of the embodiments and alternatives described above may be combined in order to form new embodiments of the invention.

In particular, the textured surface may be borne by the coating of the outer ring.

Moreover, although the invention is particularly advantageous within the scope of a joint member of the light-weight type, i.e. the rings of which are made in a lightweight material coated with deposits, it may be just as well applied to other types of joint members, notably to joint members including a ring having a coating in an accommodating material and a ring having a coating in a shaping material.

The invention claimed is:

1. A ball joint member, including:
   an inner ring, with a general axisymmetrical shape around a first axis, comprising an external contact surface having a truncated spherical shape, the inner ring including a coating which bears the external contact surface; and
   an outer ring, of a general axisymmetrical shape around a second axis, comprising an internal contact surface mating said external contact surface, cooperating with said external contact surface, the outer ring including a coating which bears the internal contact surface, wherein at least one of the inner and outer rings comprises lubricant reservoirs made on the coating of one of the external and internal contact surfaces, and wherein the coating of the contact surface of one of the rings is a textured surface comprising a pattern of micro-cavities containing the lubricant and forming the lubricant reservoirs.

2. The joint member according to claim 1, wherein said textured surface includes at least one transverse groove extending between first and second ends shifted in the direction of the axis of the corresponding ring.

3. The joint member according to claim 2, wherein each transverse groove has a sinuous shape.

4. The joint member according to claim 2, wherein said textured surface includes a central circumferential groove circularly extending around the axis of the corresponding ring, at least one of the transverse grooves opening into the central circumferential groove.

5. The joint member according to claim 1, wherein the pattern of micro-cavities extends over the whole of the textured surface.

6. The joint member according to claim 1, wherein each micro-cavity has a diameter comprised between 10 and 100 μm.

7. The joint member according to claim 1, wherein the lubricant reservoirs are fluidically connected to each other or not.

8. The joint member according to claim 1, wherein the lubricant reservoirs also comprise at least one groove extending over a portion of the surface contact of one of the rings.

9. The joint member according to claim 8, wherein the lubricant reservoirs include at least one circumferential groove, circularly extending around the central axis of one of the rings.

10. The joint member according to claim 8, wherein the depth of the grooves with respect to the contact surfaces is of the order of 1 mm.

11. The joint member according to claim 8, wherein the width of the grooves is of the order of 1 mm.

12. The joint member according to claim 1, wherein at least one of the rings is made of a titanium alloy.

13. The joint member according to claim 1, wherein the coating of the inner ring is made from a copper alloy.

14. The joint member according to claim 13, wherein the coating of the inner ring is made of CuNiIn, or CuAlFe with graphite.

15. The joint member according to claim 1, wherein the coating of the outer ring is made from a material selected in a list of alloys including tungsten carbide, chromium nitride and titanium nitride.

* * * * *